US012777437B2

(12) United States Patent
Fu et al.

(10) Patent No.: US 12,777,437 B2
(45) Date of Patent: Oct. 27, 2026

(54) METHOD FOR TIME SYNCHRONIZATION AND USER EQUIPMENT

(71) Applicant: GUANGDONG OPPO MOBILE TELECOMMUNICATIONS CORP., LTD., Dongguan (CN)

(72) Inventors: Zhe Fu, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 305 days.

(21) Appl. No.: 18/416,377

(22) Filed: Jan. 18, 2024

(65) Prior Publication Data

US 2024/0155521 A1 May 9, 2024

Related U.S. Application Data

(63) Continuation of application No. PCT/CN2021/108464, filed on Jul. 26, 2021.

(51) Int. Cl.
*H04W 56/00* (2009.01)
*H04J 3/06* (2006.01)
*H04W 92/18* (2009.01)

(52) U.S. Cl.
CPC ....... *H04W 56/0015* (2013.01); *H04J 3/0667* (2013.01); *H04W 92/18* (2013.01)

(58) Field of Classification Search
None
See application file for complete search history.

(56) References Cited

U.S. PATENT DOCUMENTS

2018/0139714 A1 5/2018 Li
2018/0352525 A1 12/2018 Li
2019/0190635 A1 6/2019 Goel
2020/0322911 A1 10/2020 Li
2021/0168740 A1 6/2021 Park
(Continued)

FOREIGN PATENT DOCUMENTS

CN 108476482 A 8/2018
CN 112512113 A 3/2021
(Continued)

OTHER PUBLICATIONS

Supplementary European Search Report in the European application No. 21951162.3, mailed on Oct. 10, 2024, 17 pages.
(Continued)

*Primary Examiner* — Anh Vu H Ly
(74) *Attorney, Agent, or Firm* — Ladas & Parry LLP

(57) ABSTRACT

A method for time synchronization and a user equipment (UE) are provided. The method comprises the following operations. A first UE acquires first time information, the first time information being absolute time information, reference time information or partial information in the reference time information. The first UE sends first synchronization information to a second UE through a sidelink, the first synchronization information including or not including the first time information. The first time information is transmitted to the second UE through a Synchronization Signal Block (SSB), a Physical Sidelink Broadcast Channel (PSBCH) or dedicated signaling.

14 Claims, 5 Drawing Sheets

(56) References Cited

U.S. PATENT DOCUMENTS

| | | | | |
|---|---|---|---|---|
| 2021/0219248 | A1 | 7/2021 | Wu | |
| 2021/0392592 | A1 | 12/2021 | Ko | |
| 2022/0140967 | A1* | 5/2022 | Khoryaev | H04W 56/002 375/220 |
| 2023/0284163 | A1* | 9/2023 | Yu | H04W 72/25 370/312 |
| 2024/0097855 | A1 | 3/2024 | Hong | |

FOREIGN PATENT DOCUMENTS

| | | | |
|---|---|---|---|
| WO | 2020091547 | A1 | 5/2020 |
| WO | 2021071328 | A1 | 4/2021 |

OTHER PUBLICATIONS

Nttdocomo, Inc. "Discussion on Uplink Time Synchronization for TSN", 3GPP TSG-RAN WG2 #111-e R2-2007294, Aug. 28, 2020 (Aug. 28, 2020), section 2.1, Option 1. 4 pages.

International Search Report in the international application No. PCT/CN2021/108464, mailed on Apr. 26, 2022. 5 pages with English translation.

Written Opinion of the International Search Authority in the international application No. PCT/CN2021/108464, mailed on Apr. 26, 2022. 7 pages with English translation.

"3rd Generation Partnership Project; Technical Specification Group Radio Access Network; NR; Radio Resource Control (RRC) protocol specification (Release 16)", 3GPP TS 38.331 V16.4.1 (Mar. 2021), pp. 40-890. 946 pages.

* cited by examiner

METHOD FOR TIME SYNCHRONIZATION AND USER EQUIPMENT

CROSS-REFERENCE TO RELATED APPLICATIONS

This is a continuation application of International Patent Application No. PCT/CN2021/108464, filed on Jul. 26, 2021, the disclosure of which is hereby incorporated by reference in its entirety.

BACKGROUND

In a communication system, a User Equipment (UE) can communicate with another UE directly through a sidelink. In an existing synchronization mechanism for the sidelink, the UE determines a synchronization source before communicating with another UE, and acquire synchronization information from the synchronization source for time synchronization.

However, the above synchronization mechanism for the sidelink only supports time synchronization for a System Frame Number (SFN) level, or only supports time synchronization for a frame boundary, which results in low precision of the time synchronization in the sidelink and cannot meet precision requirements for the time synchronization in transmission of services (for example, Ultra-reliable Low Latency Communication (URLLC) services).

SUMMARY

The present disclosure relates to the technical field of communications. The present disclosure provides a method for time synchronization and a user equipment, to improve the precision of time synchronization in a sidelink.

A first aspect of the embodiments of the present disclosure provides a method for time synchronization, which includes following operations. A first User Equipment (UE) acquires first time information. The first time information is absolute time information, reference time information or partial information in the reference time information. The first UE sends first synchronization information to a second UE through a sidelink. The first synchronization information includes the first time information, or the first synchronization information does not include the first time information. The first time information is transmitted to the second UE through a Synchronization Signal Block (SSB), a Physical Sidelink Broadcast Channel (PSBCH) or dedicated signaling.

A second aspect of the embodiments of the present disclosure provides a first User Equipment (UE), which includes a memory for storing a program, a transceiver and a processor. The processor is configured to invoke the program stored in the memory to acquire first time information. The first time information is absolute time information, reference time information or partial information in the reference time information. The processor is configured to invoke the program stored in the memory to control the transceiver to send first synchronization information to a second UE through a sidelink. The first synchronization information includes the first time information, or the first synchronization information does not include the first time information. The first time information is transmitted to the second UE through a Synchronization Signal Block (SSB), a Physical Sidelink Broadcast Channel (PSBCH) or dedicated signaling.

A third aspect of the embodiments of the present disclosure provides a second User Equipment (UE), which includes a memory for storing a program and a processor. The processor is configured to invoke the program stored in the memory to acquire first time information. The first time information is absolute time information, reference time information or partial information in the reference time information. The processor is configured to invoke the program stored in the memory to perform absolute time synchronization with a target node according to the first time information. The target node is a first UE connected to the second UE through a sidelink, or the target node is a synchronization source as an end station of a Time Sensitive Network (TSN) among multiple candidate synchronization sources, or the target node is a base station accessed by the second UE. The first time information is acquired from first synchronization information sent by the first UE, or the first time information is acquired from a Synchronization Signal Block (SSB) sent by the first UE, a Physical Sidelink Broadcast Channel (PSBCH) sent by the first UE or dedicated signaling sent by the first UE, or the first time information is acquired from the base station accessed by the second UE.

DETAILED DESCRIPTION

Technical solutions in the present disclosure will be described in conjunction with the accompanying drawings. For ease of understanding of the present disclosure, a communication system to which embodiments of the present disclosure are applied, involved terminologies and communication procedures are described below with reference to FIGS. 1 to 5.

Figure 1:
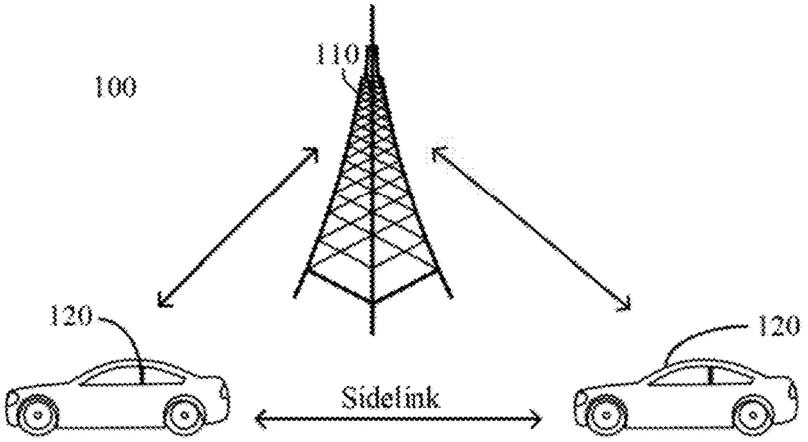
FIG. 1 shows a wireless communication system 100 to which an embodiment of the present disclosure is applied.

FIG. 1 shows a wireless communication system 100 to which an embodiment of the present disclosure is applied. The wireless communication system 100 may include a network device 110 and terminal devices 120. The network device 110 may be a device that communicates with the terminal device 120. The network device 110 may provide communication coverage for a particular geographic area and may communicate with the terminal devices 120 located within the coverage area.

In some embodiments, the two terminal devices illustrated in FIG. 1 may communicate directly with each other. For example, the two terminal devices may communicate with each other through a sidelink (SL).

FIG. 1 exemplarily illustrates one network device and two terminal devices. Optionally, the wireless communication system 100 may include multiple network devices and other numbers of terminal devices may be included within the coverage area of each network device, which is not limited by the embodiments of the present disclosure.

Optionally, the wireless communication system 100 may further include other network entities such as a network controller and a mobility management entity, which is not limited by the embodiments of the present disclosure.

It should be understood that the technical solutions of the embodiments of the present disclosure may be applied to various communication systems, such as the 5th generation (5G) system or new radio (NR), a long term evolution (LTE) system, an LTE frequency division duplex (FDD) system, an LTE time division duplex (TDD) system. The technical solutions provided by the present disclosure can also be applied to future communication systems, such as the sixth generation mobile communication system, a satellite communication system.

The terminal device in the embodiments of the present disclosure may also be referred to as a UE, an access terminal, a subscriber unit, a subscriber station, a mobile platform, a mobile station (MS), a mobile terminal (MT), a remote station, a remote terminal, a mobile device, a user terminal, a terminal, a wireless communication device, a user agent or a user apparatus. The terminal device in the embodiments of the present disclosure may be a device providing voice and/or data connectivity to a user, and may be used to connect human beings, objects and machines, such as a handheld device, a vehicle-mounted device or the like that has a wireless connection function. The terminal device in the embodiments of the present disclosure may also be a terminal device in internet of things (IOT) or Industrial interest of Things (HOT), for example, an electronic water meter, a smart meter and the like. The terminal device in the embodiments of the present disclosure may be a mobile phone, a Pad, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in smart grid, a wireless terminal in transportation safety, a wireless terminal in a smart city, and a wireless terminal in a smart home, etc. Optionally, the UE may be used as a base station. For example, the UE may act as a scheduling entity that provides sidelink signals between UEs in V2X or D2D or the like. For example, a cellular phone and a car communicate with each other by using a sidelink signal. The cellular phone communicates with a smart home device without relaying a communication signal through a base station.

The network device in the embodiments of the present disclosure may be a device for communicating with the terminal device. The network device may also be referred to as an access network device or a radio access network device. For example, the network device may be a base station. The network device in the embodiments of the present disclosure may refer to a radio access network (RAN) node (or device) that accesses the terminal device into a wireless network. Broadly speaking, the base station can cover or replace the following devices such as a Node B, an evolved NodeB (eNB), a next generation NodeB (gNB), a relay station, an access point, a transmitting and receiving point (TRP), a transmitting point (TP), a main station MeNB, a secondary station SeNB, a multi-standard wireless (MSR) node, a home base station, a network controller, an access node, a wireless node, an access point (AP), a transmission node, transceiver node, a base band unit (BBU), a remote radio unit (RRU), an active antenna unit (AAU), a remote radio head (RRH), a central unit (CU), a distributed unit (DU), a positioning node and the like. The base station may be a macro base station, a micro base station, a relay node, a donor node or the like, or a combination thereof. The base station may also refer to a communication module, a modem or a chip provided in the above mentioned device or the device. The base station may also be a device functioned as a base station in a mobile switching center, a D2D communication, a V2X communication or a machine-to-machine (M2M) communication, a network-side device in the 6G network, a device functioned as a base station in a future communication system, and the like. The base station can support networks with the same or different access technologies. The specific technology and the specific device form adopted by the network device are not limited by the embodiments of the present disclosure.

The base station can be fixed or mobile. For example, a helicopter or an unmanned aerial vehicle may be configured to act as a mobile base station and one or more cells may move depending on the location of the mobile base station. In other examples, a helicopter or an unmanned aerial vehicle may be served as a device for communicating with another base station.

In some deployments, the network device in the embodiments of the present disclosure may refer to the CU or the DU or the network device includes the CU and the DU. The gNB can further include the AAU.

The network device and terminal device can be deployed on land including indoors or outdoors, and may be hand-held or vehicle-mounted. The network device and terminal device can also be deployed on the water surface. The network device and terminal device can also be deployed on airplanes, balloons and satellites in the air. The scenario in which the network device and the terminal device are located is not limited in the embodiments of the present disclosure.

It should be understood that the communication device in the present disclosure may be the network device or the terminal device. For example, the first communication device is the network device and the second communication device is the terminal device. In another example, the first communication device is the terminal device, and the second communication device is the network device. In another example, both the first communication device and the second communication device are network devices or both the first communication device and the second communication device are terminal devices.

It should also be understood that all or part of the functionality of the communication device in the present disclosure may also be implemented by software functionality running on hardware or by virtualization functionality instantiated on a platform (e.g., a cloud platform).

5G network architecture is described as follows.

Figure 2:
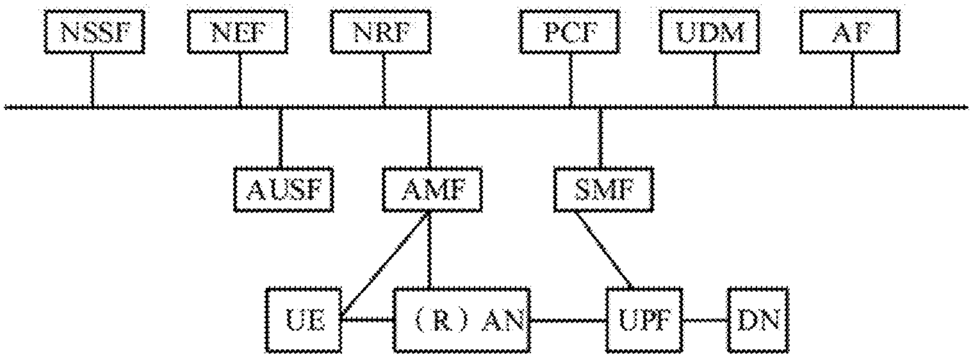
FIG. 2 is a schematic diagram of network architecture of the 5G system.

FIG. 2 is a schematic diagram of network architecture of the 5G system. The network architecture includes a UE, an access network (RN) device and core network elements.

The access network device may also be a radio access network (RAN) device.

The core network elements may include a user plane function (UPF), a data network (DN), an authentication server function (AUSF), an access and mobility management function (AMF), a session management function (SMF), a network slice selection function (NSSF), a network exposure function (NEF), and a network repository function (NRF), a policy control function (PCF), a unified data management (UDM) function, and an application function (AF).

The core network elements can be divided into a control plane network element and a user plane network element. The user plane network element, referred to as the UPF network element, is responsible for packet forwarding, quality of service (QoS) controlling, accounting information statistics and so on. The control plane network element is responsible for business process interaction, sending data packet forwarding policies and QoS control policies to the user plane. The control plane network element in the embodiments of the present disclosure includes the following network elements: AMF, SMF, PCF, AF and NEF.

The AMF network element is responsible for access and mobility management of the user. The SMF network element is responsible for managing the creation and deletion of user protocol data unit (PDU) sessions, maintaining PDU session context and user plane forwarding pipeline information. The PCF network element is used to generate and manage the user, the sessions and QoS flow processing policies. The AF network element is a functional network element for providing various business services, and can interact with a core network through the NEF network element, and can interact with policy management framework for policy management. The NEF network element is used to provide the framework, authentication and interface related to the network exposure function, and transfer information between network functions of the 5G system and other network functions.

Convergence of time sensitive network (TSN) and communication system is described as follows.

With the development of technologies, the IIOT supports the transmission of services related to factory automation, transport industry, smart grid and the like. These services usually require lower transmission delay and higher reliability. Therefore, the IIoT introduces TSN and time sensitive communication (TSC) to meet the transmission requirements of the above services. In addition, the URLLC function in the communication system (for example, the 5G system) can be well matched with the TSN. Therefore, in practical application, these two key technologies can be integrated to provide end-to-end deterministic connection.

Figure 3:
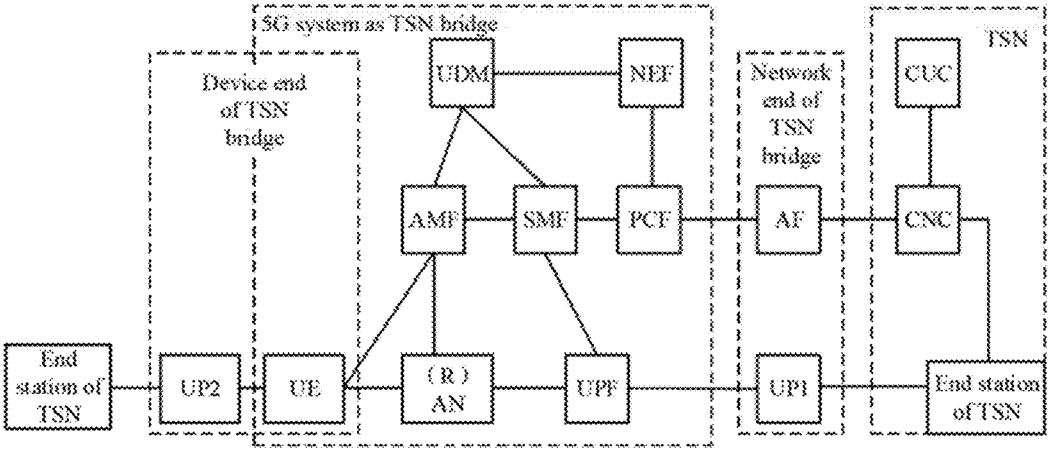
FIG. 3 is a schematic diagram of network architecture of the convergence of a time sensitive network and the 5G system.

FIG. 3 is a schematic diagram of network architecture of the convergence of a time sensitive network and the 5G system. In order to realize end-to-end deterministic transmission in the 5G system, the assumption that the 5G system can be virtualized as a switching node in the TSN (also called "TSN Bridge") and realize the function of the switching node in the TSN is put forward. Referring to the schematic diagram of network architecture illustrated in FIG. 2, a control plane of a TSN adaptation function is added to the AF network element, a user plane (UP) 1 of the TSN adaptation function is added to the UPF network element, and a UP2 of the TSN adaptation function is added to a UE. The above added three planes together with the 5G system form a logical switching node, that is, a virtual switching node as a switching node in the TSN. Although the UPF and the UP1, as well as the UE and the UP2 are drawn separately in the FIG. 2, the UP1 and the UP2 are actually logical functions of the TSN adaptation function of the user plane, the UP1 can be deployed on the UPF network element, or the UP1 can be an internal function module of the UPF network element. Similarly, the UP2 can be deployed on the UE, or the UP2 can be an internal function module of the UE.

The TSN adaptation function refers to adapting characteristics and information of the 5G network into the information required by the TSN and communicating with network elements in the TSN through the interface defined by the TSN. The TSN adaptation function can be realized by a TSN translator (TT). Generally, the UP2 of the TSN adaptation function added on the UE is referred to as a device-side TSN translator (DS-TT), and the UP1 of the TSN adaptation function added on the UPF is referred to as a network-side TSN translator (NW-TT). The AF network element can interact with a center network configuration (CNC) network element in the TSN and provide the information of the logical switching node to the CNC network element according to the requirement of the switching node of the TSN. The user plane of the TSN adaptation function provides the necessary information to the control plane of the TSN adaptation function. That is, the UP1 can provide to the AF network element the necessary information, for example, the information of the switching node in the TSN.

In order to meet transmission requirements of services in the TSN, the 5G system supports higher precision of time synchronization to implement time synchronization with the TSN.

Time synchronization in TSN is described as follows.

Figure 4:
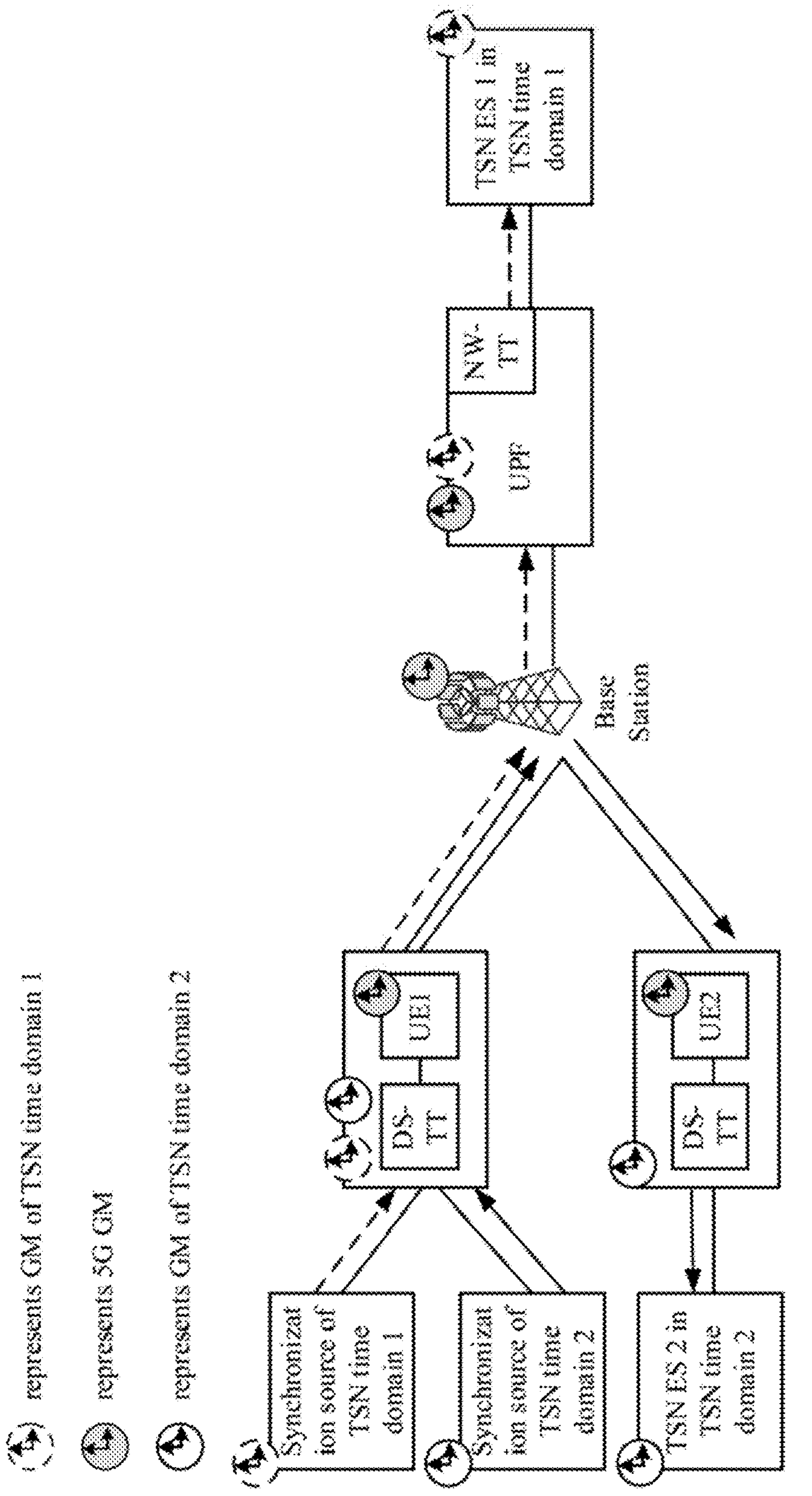
FIG. 4 is a schematic diagram of time synchronization in a TSN.

FIG. 4 illustrates the mode of time synchronization in a TSN. It should be understood that functionality of nodes in FIG. 4 has been described above in conjunction with FIG. 3 and will not be repeated below for the sake of brevity. Combined with the TSN illustrated in FIG. 4, the time synchronization mode is introduced in two scenarios where the end station (ES) of the TSN is connected to a UE or a UPF.

In the first scenario, assuming that a PDU session has been established between a UE1 and a base station, and a PDU session has been established between a UPF and an AMF, an SMF, a PCF and an AF, when a TSN ES1 in a TSN time domain 1 is connected to the UPF, a time synchronization process may include the following operations 1 to 5.

At an operation 1, a synchronization source of the TSN time domain 1 sends, via a generalized precision time protocol (gPTP) message 1, an internal grand master (GM) clock of the TSN time domain 1 to the UE1 after delaying for a time delay $t_1$, and clock information is set as $T_{gm1}$.

At an operation 2, after the arrival of the gPTP message 1, the UE1 records an arrival time of the gPTP message 1 as $T_{i1}$ based on the time indicated by the 5G GM. Then, the UE1 sends the gPTP message 1 to the base station through an uplink air interface.

At an operation 3, the base station transports the received gPTP message 1 to the UPF.

At an operation 4, after receiving the gPTP message 1, the UPF sends the gPTP message 1 to the TSN ES1 after delaying for a time delay $t_2$, and the UPF records a departure time when the gPTP message 1 leaves the 5G system as $T_{e1}$ based on the time indicated by the 5G GM.

At an operation 5, after receiving the gPTP message 1, the TSN ES1 updates the clock of the TSN ES1 to $T_{TSN\ EST1}=T_{gm1}\pm t_1\pm t_2\pm T_{e1}-T_{i1}$.

In the second scenario, assuming that a PDU session is established between a UE1 and a base station, and a PDU session is established between a UPF and an AMF, an SMF, a PCF and an AF, when an end station of a TSN time domain 2 is connected to a UE2, a time synchronization process may include the following operations 1 to 5.

At an operation 1, a synchronization source of the TSN time domain 2 sends, via a gPTP message 2, a GM clock of the TSN time domain 2 to the UE1 after delaying for a time delay $t_3$, and clock information is set as $T_{gm2}$.

At an operation 2, after the arrival of the gPTP message 2, the UE1 records the arrival time of the gPTP message 2 as $T_{i2}$ based on the time indicated by the 5G GM. Then, the UE1 sends the gPTP message 2 to the base station (gNB) through an uplink air interface.

At an operation 3, the gNB transports the received gPTP message 2 to the UE2.

At an operation 4, after receiving the gPTP message 2, the UE2 sends the gPTP message 2 to a TSN ES2 after delaying for a time delay $t_4$, and the UE2 records the departure time when the gPTP message 2 leaves the 5G system as Tee based on the time indicated by the 5G GM.

At an operation 5, after receiving the gPTP message 2, the TSN ES2 updates the clock of the TSN ES2 to $T_{TSN\ EST2}=T_{gm2}\pm t_3\pm t_4\pm T_{e2}-T_{i2}$.

Based on the above introduction, it can be seen that the synchronization process of the TSN is inseparable from the time synchronization in the 5G system. At present, in order to meet the high-precision synchronization of the TSN, the synchronization process between the network device and the UE in the 5G system can be performed based on reference time information described below.

Reference time information is described below.

Based on specifications of the current protocol, the reference time information usually includes reference time and relevant information of the reference time. The reference time can include reference days (refDays), reference seconds (refSeconds), reference milliseconds (refMilliseconds), reference ten nanoseconds (refTenNanoSeconds). The relevant information of the reference time includes uncertainty, a type of time information and a reference system frame number (SFN).

In addition, it is further specified in the current protocol that the base station can send the reference time information through a system information block (SIB) 9 or dedicated downlink information (DLinformation) transfer signaling.

As described above, the UE can communicate directly with another UE through the sidelink. Therefore, in order to ensure the normal reception and transmission of data on the sidelink, time synchronization between UEs is also required. Based on the existing sidelink synchronization mechanism, before communicating with another UE, the UE determines a synchronization source and acquires synchronization information from the synchronization source. The synchronization source can be another UE, a base station or a global navigation satellite system (GNSS). If the synchronization source is a UE, the UE serving as the synchronization source can also be called a synchronization reference UE (SyncRef UE). The synchronization reference UE may send a sidelink synchronization signal (SLSS) through the sidelink or send synchronization information through a physical sidelink broadcast channel (PSBCH) to assist the another UE in performing time synchronization.

However, in the sidelink, only time synchronization at an SFN level is supported, or only frame boundary-based time synchronization is supported, which cannot meet precision requirements of URLLC transmission for time synchronization. In addition, due to the low precision of time synchronization supported in the sidelink, the precision requirements of the URLLC transmission for time synchronization cannot be met, and services in the TSN cannot match URLLC functions in the sidelink. That is to say, the current precision of time synchronization in the sidelink cannot meet the precision requirements of the services in the TSN for time synchronization.

In order to avoid the above problems, the present disclosure provides a method for time synchronization, which, based on the first time information, enable multiple UEs on the sidelink to perform absolute time synchronization, to improve the precision of time synchronization among the multiple UEs on the sidelink. Hereinafter, the method for time synchronization according to the embodiments of the present disclosure is introduced by taking “a first UE” and “a second UE” as examples in conjunction with FIG. 5.

Figure 5:
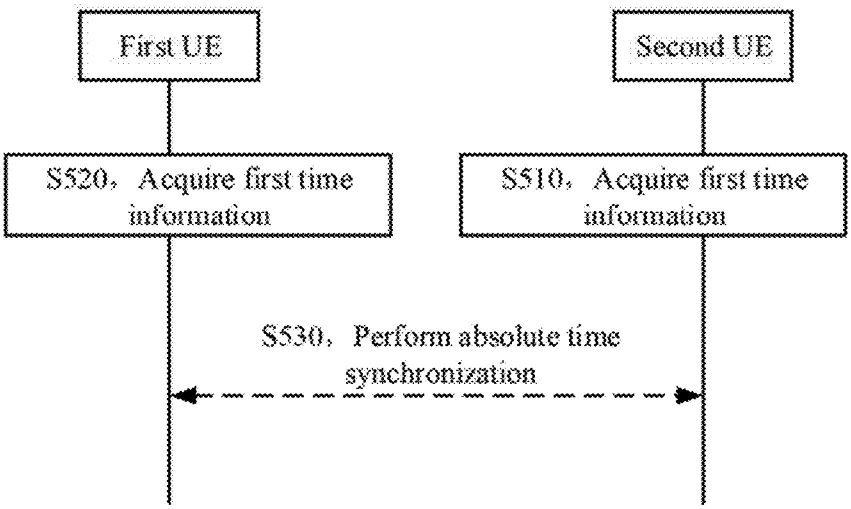
FIG. 5 is a flowchart of a method for time synchronization according to an embodiment of the present disclosure.

FIG. 5 is a flowchart of a method for time synchronization according to an embodiment of the present disclosure. The method illustrated in FIG. 5 includes operations S510 to S530.

At an operation S510, a second UE acquires first time information.

The first time information indicates absolute time which can be understood as time that does not change with any external action or observer. In some implementations, the first time information is absolute time information, reference time information or partial information in the reference time information.

If the first time information is the reference time information or the partial information in the reference time information, a format of the first time information may conform to a format of the reference time information specified in the current protocol. Reference may be made to the above introduction on the reference time information for the detailed description. Also, the time in the first time information can be redefined. The embodiments of the present disclosure are not specifically limited thereto.

In some implementations, the first time information may include reference time. The reference time indicates absolute time. The reference time may have the same content as the reference time in the reference time information described above. In some implementations, the reference time includes contents identifying a day, a hour, a minute, a second, a millisecond and so on. In other implementations, in addition to the reference time, the first time information further includes at least one of the following information: a reference SFN, a reference time slot, uncertainty, a type of synchronization time.

The second UE acquires the first time information in many manners. For example, the second UE can acquire the first time information from a base station accessed by the second UE, or the second UE can also acquire the first time information from the GNSS, or the second UE can also acquire the first time information from the first UE.

Generally, in order to be compatible with existing protocols, when the second UE acquires the first time information from the first UE, the first time information may be carried in first synchronization information transmitted from the first UE to the second UE. The first time information can also be transmitted from the first UE to the second UE through other signaling. For example, the first time information can also be transmitted to the second UE through synchronization signal block (a sidelink-SS/PBCH block (S-SSB)) or dedicated signaling. The dedicated signaling may, for example, be carried in a physical sidelink control channel (PSCCH), which is not limited in the embodiments of the present disclosure.

Based on the existing synchronization mechanism, the first synchronization information usually includes a reference frame or a reference time slot. In order to be compatible with the existing synchronization mechanism, in some implementations, the first time information can also be used to determine absolute time corresponding to the reference frame or a reference time slot in the first synchronization information.

In some implementations, the reference frame or the reference time slot may be determined by a PSBCH, an S-SSB, a frame or a time slot corresponding to a side-primary synchronization signal (S-PSS) or a sidelink-secondary synchronization signal (S-SSS).

In some implementations, the first synchronization information may be carried in the PSBCH, and the first synchronization information includes an SFN and a time slot number corresponding to the S-PSS or the S-SSS.

At an operation S520, a first UE acquires the first time information.

The first time information acquired by the first UE indicates the same absolute time as the first time information acquired by the second UE. In such a case, after the first UE and the second UE perform absolute time synchronization based on the first time information, absolute time synchronization is implemented between the first UE and the second UE. Therefore, the first time information can be understood as information for absolute time synchronization between the first UE and the second UE.

In some implementations, the first UE may acquire the first time information from a base station accessed by the first UE. The first UE may also acquire the first time information from other UEs (such as a third UE described below), or the first UE may also acquire the first time information from the GNSS. This is not limited by the embodiments of the present disclosure.

At an operation S530, the second UE performs absolute time synchronization with a target node according to the first time information.

The target node can be understood as a node with which the second UE performs absolute time synchronization. The target node may be the first UE connected to the second UE through the sidelink. The target node may also be a synchronization source as an end station of the TSN among multiple candidate synchronization sources. The target node may also be the base station accessed by the second UE. The target node can also be a GNSS node.

If the target node is the GNSS node, the time precision of the GNSS can be improved for the precision requirement of time synchronization. For example, the time precision of the GNSS can be raised up to a nanosecond level. Also, if the time precision of the GNSS is sufficient, the absolute time synchronization can also be performed directly based on the time of the GNSS.

In the embodiments of the present disclosure, the first UE and the second UE in the sidelink can perform absolute time synchronization with each other based on the first time information, which improves the precision of time synchronization in the sidelink, compared with the existing synchronization mechanism that only supports an SFN level in the sidelink.

As described above, the first synchronization information sent by the first UE to the second UE may include the first time information or may not include the first time information. Whether the first synchronization information includes the first time information can be determined by the first UE, or may be indicated to the first UE by the base station accessed by the first UE or indicated to the first UE by the second UE, and may also be determined by the first UE based on a predetermined rule.

Generally, a UE as a node (e.g., an end station, an incoming node, or an outgoing node) of the TSN, or a UE which transmits a gPTP message have a high requirement for the precision of time synchronization. Therefore, in some implementations, the first UE may determine to carry the first time information in the first synchronization information based on at least one of following information: the first UE is a UE as an end station of the TSN; the first UE is an incoming node of the TSN; the second UE is a UE as an end station of the TSN; the second UE is an outgoing node of the TSN; the first UE knows that the second UE is a UE as an end station of the TSN; the first UE is a node which sends a gPTP message; or the second UE is a node which receives a gPTP message.

In other implementations, in case that the first UE receives from the second UE a request for requesting the first UE to send the first time information, the first UE may also carry the first time information in the first synchronization information.

In addition, the UE as a node of the TSN (e.g., an end station, an incoming node or an outgoing node) or the UE which sends a gPTP message have a high requirement for the precision of time synchronization. Therefore, the second UE determines whether to request the first UE to carry the first time information in the first synchronization information, by taking the following two cases into count: whether the first UE and/or the second UE is a node of the TSN; or whether the first UE and/or the second UE is a transmission node of a gPTP message. For example, the second UE may determine whether to send the request to the first UE based on at least one of the following information: the first UE is a UE as an end station of the TSN; the first UE is an incoming node of the TSN; the second UE is a UE as an end station of the TSN; the second UE is an outgoing node of the TSN; the first UE knows that the second UE is a UE as an end station of the TSN; the first UE is a node which sends a gPTP message; or the second UE is a node of a gPTP message.

In other implementations, the first UE may also determine, based on the indication of a third UE, whether to carry the first time information in the first synchronization information. For example, the first UE receives second synchronization information sent by the third UE, the second synchronization information includes indication information, and the indication information instructs the first UE to send the first synchronization information including the first time information to the second UE.

In some implementations, in response to the third UE being a UE as an end station of the TSN, the third UE has higher precision of time synchronization. Therefore, the third UE may determine whether to instruct the first UE to carry the first time information in the first synchronization information based on whether the third UE is an end station of the TSN. In response to the third UE being not an end station of the TSN, the third UE may also instruct the first UE to carry the first time information in the first synchronization information, which is not limited in the embodiments of the present disclosure.

Figure 6:
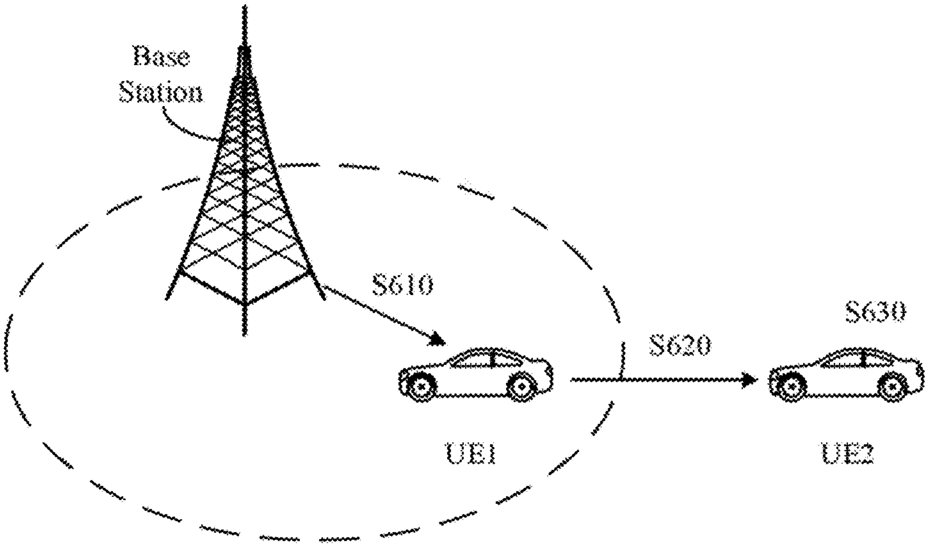
FIG. 6 is a flowchart of a method for time synchronization according to another embodiment of the present disclosure.

In order to facilitate understanding of the present disclosure, the flow of the method for time synchronization according to the embodiments of the present disclosure is described below in connection with the scenario illustrated in FIG. 6, taking a case that the second UE acquires the first time information from the first UE as an example. It should be understood that reference may be made to the above introduction for the terminologies and the specific manners of information transmission involved in FIG. 6, which will not be repeated below for the sake of brevity. Referring to FIG. 6, assuming that the UE1 is a synchronization reference terminal, the UE2 is to perform absolute time synchronization with the UE1.

In an operation S610, the UE1 acquires the first time information from the base station accessed by the UE1 and performs absolute time synchronization based on the first time information.

In an operation S620, in response to the UE1 and/or the UE2 being an end station of the TSN, the UE1 determines to send the first synchronization information to the UE2 through a PSBCH.

The first synchronization information includes a reference SFN and a reference time slot corresponding to the S-PSS and the S-SSS, and the first time information. The first time information is absolute time corresponding to the reference SFN. For example, if the reference SFN is 5, the first time information is five minutes and five seconds past five (5:05:05).

In an operation S630, the UE2 performs absolute time synchronization based on the first time information. In other words, the UE2 performs absolute time synchronization with the UE1 based on the first time information.

A case that the target node is the first UE and the second UE performs absolute time synchronization based on the first time information sent by the first UE is described above with reference to FIG. 6. A case that the target node is the first UE and the first UE and the second UE respectively acquire the first time information from the base station and perform absolute time synchronization will be described below.

The case that the first UE and the second UE respectively acquire the first time information from the base station includes two scenarios. In the first scenario, the base station accessed by the first UE is the same as the base station accessed by the second UE. In the second scenario, the base station accessed by the first UE is different from the base station accessed by the second UE.

For the first scenario, in a case that the first UE and the second UE access to the same base station and acquire the first time information from the base station, the absolute time or an absolute time reference indicated by the first time information acquired by the first UE and the second UE are the same. Therefore, the first UE and the second UE can perform absolute time synchronization directly based on the first time information. That is, the operation S530 may include the following operation. In response to the base station accessed by the first UE being the same as the base station accessed by the second UE, the second UE performs absolute time synchronization with the first UE according to the first time information.

Optionally, in the first scenario, although the second UE can acquire the first time information from the base station, the first UE can send the first time information to the second UE in order to improve the reliability of the transmission of the first time information. In such a way, in a case that the second UE cannot acquire the first time information from the base station, the second UE can also perform absolute time synchronization based on the first time information sent by the first UE. Reference may be made to the above introduction for the manner in which the first UE sends the first time information to the second UE, which will not be described here for the sake of brevity.

The first UE may also no longer send the first time information to the second UE, in order to reduce the overhead caused by transmission of signaling.

For the second scenario, for convenience of description, the base station accessed by the first UE is referred to as the first base station, and the base station accessed by the second UE is referred to as the second base station.

In response to the first base station being different from the second base station, the second UE can perform absolute time synchronization with the first UE based on a time difference between the first base station and the second base station and the first time information acquired from the second base station.

Of course, in response to a frame boundary of the first base station being the same as a frame boundary of the second base station, or absolute time of the first base station being the same as absolute time of the second base station, or an absolute time reference of the first base station being the same as an absolute time reference of the second base station, or a time difference between the first base station and the second base station being 0, the absolute time indicated by the first time information acquired by the first UE is the same as the absolute time indicated by the first time information acquired by the second UE, or the absolute time reference corresponding to the first time information acquired by the first UE is the same as the absolute time reference corresponding to the first time information acquired by the second UE, so that the first UE and the second UE can perform absolute time synchronization with each other directly based on the first time information. That is, the operation S530 includes the following operation. In response to a frame boundary of the first base station being the same as a frame boundary of the second base station, or absolute time of the first base station being the same as absolute time of the second base station, or an absolute time reference of the first base station being the same as an absolute time reference of the second base station, the second UE performs absolute time synchronization with the first UE according to the first time information.

In response to a frame boundary of the first base station being different from a frame boundary of the second base station, or absolute time of the first base station being different from absolute time of the second base station, or an absolute time reference of the first base station being different from an absolute time reference of the second base station, or a time difference between the first base station and the second base station not being 0, the second UE performs absolute time synchronization with the first UE according to the first time information and the time difference between the first base station and the second base station.

The time difference between the first base station and the second base station may be determined by the first UE, or determined by the second UE, or determined by the first base station, or determined by the second base station. In some implementations, in a case that the time difference is determined by the second UE, the base station accessed by the first UE may be informed by the first UE to the second UE, and the second UE determines the time difference between the first base station and the second base station. In other implementations, in a case that the time difference is determined by the first UE, the second UE may inform the first UE of the second base station accessed by the second UE. In other implementations, in a case that the time difference is determined by the first base station, the second UE may inform the second base station accessed by the second UE to the first base station through the first UE. In other implementations, in a case that the time difference is determined by the second base station, the first UE may inform the first base station accessed by the first UE to the second base station through the second UE. Also, in a case that the time difference is determined by the base station, the base station can determine the time difference through signaling interaction between the base stations. For example, in a case that the time difference is determined by the first base station, the first base station may acquire the absolute time of the second base station through signaling interaction between the base stations to determine the time difference between the first base station and the second base station. As another example, in a case that the time difference is determined by the second base station, the second base station may acquire the absolute time of the first base station through signaling interaction between the base stations to determine the time difference between the first base station and the second base station.

Accordingly, after the time difference is determined by the first UE, the first base station or the second base station, the time difference can be sent to the second UE, so that the second UE can perform absolute time synchronization.

In addition, the second UE may also determine whether there is a time difference between the first base station and the second base station directly based on the indication of the first UE. In some implementations, in case that the first UE carries the time difference in information sent to the second UE, the second UE may perform absolute time synchronization based on the time difference. In other implementations, in case that the first UE does not carry the time difference in the information sent to the second UE, the second UE may determine that there is no time difference between the first base station and the second base station, or the time difference between the first base station and the second base station is 0, and the second UE may perform absolute time synchronization directly based on the first time information.

It should be understood that the information sent by the first UE to the second UE may be the first synchronization information, the first time information sent by the first UE to the second UE, or other information sent by the first UE to the second UE.

In other implementations, in case that the first UE sends the first time information, the second UE may determine that the first time information acquired by the second UE from the base station is different from the first time information indicated by the first UE, or time reference corresponding to the first time information acquired by the second UE from the base station is different from time reference corresponding to the first time information indicated by the first UE.

In some cases, both the second base station and the first UE may indicate a time difference to the second UE, and in response to the time difference indicated by the second base station being different from the time difference indicated by the first UE, the second UE may preferentially select the time difference indicated by the first UE for absolute time synchronization. Also, in the embodiments of the present disclosure, in response to the time difference indicated by the second base station being different from the time difference indicated by the first UE, the second UE can also preferentially select the time difference indicated by the second base station for absolute time synchronization.

In response to the time difference indicated by the second base station being the same as the time difference indicated by the first UE, the second UE can arbitrarily select one of the time difference indicated by the second base station and the time difference indicated by the first UE for absolute time synchronization. Also, the second UE may preferentially select the time difference indicated by the first UE to perform absolute time synchronization no matter whether the time difference indicated by the second base station is the same as the time difference indicated by the first UE.

In some cases, both the second base station and the first UE may indicate the first time information to the second UE, and the second UE may preferentially select the time indicated by the first UE for absolute time synchronization.

In some cases, both the second base station and the first UE may indicate the first time information to the second UE, and in response to the first time information indicated by the first UE being different from the first time information indicated by the second UE or a time reference corresponding to the first time information indicated by the second base station being different from a time reference corresponding to the first time information indicated by the first UE, the second UE may preferentially select the time indicated by the first UE for absolute time synchronization.

In some cases, in case that the second UE determines that the first time information acquired by the second UE from the base station is different from the first time information indicated by the first UE, or a time reference corresponding to the first time information acquired by the second UE from the base station is different from a time reference corresponding to the first time information indicated by the first UE, the second UE may preferentially select the time indicated by the first UE for absolute time synchronization.

In addition, regarding whether the frame boundary of the first base station is the same as the frame boundary of the second base station, the first base station may inform the first UE of a base station having the same frame boundary as the first base station, and the first UE may inform the second UE of the base station, and the second UE can determine whether a frame boundary of the second base station accessed by the second UE is the same the frame boundary of the first base station. Also, the first UE may also determine whether the frame boundary of the second base station is the same as the frame boundary of the first base station based on the base station having the same frame boundary as the first base station that are informed by the first base station and/or the second base station accessed by the second UE. The embodiments of the present disclosure are not limited thereto.

It should be noted that regarding whether the absolute time of the first base station is the same as the absolute time of the second base station, the first base station may inform the first UE of a base station having the same absolute time as the first base station, and then the first UE may inform the second UE of the base station, and the second UE can determine whether the absolute time of the second base station accessed by the second UE is the same as the absolute time of the first base station. Also, the first UE may also determine whether the absolute time of the second base station is the same as the absolute time of the first base station based on the base stations having the same absolute time as the first base station that are informed by the first base station and the second base station accessed by the second UE. The embodiments of the present disclosure are not limited thereto.

In some implementations, in case that the target node is the first UE and the first time information is acquired by the first UE from the second base station, the second UE performs absolute time synchronization with the first UE based on the first time information includes following operations. The second UE performs absolute time synchronization with the second base station based on the first time information, and the second UE performs absolute time synchronization with the first UE based on the time difference between the first UE and the second base station. Also, the second UE can perform absolute time synchronization with the first UE directly based on the first time information and the time difference the first UE and the second base station.

It should be understood that after absolute time synchronization between the first UE and the first base station are performed, the time difference between the first UE and the first base station can be understood as the time difference between the first base station and the second base station as described above.

Figure 7:
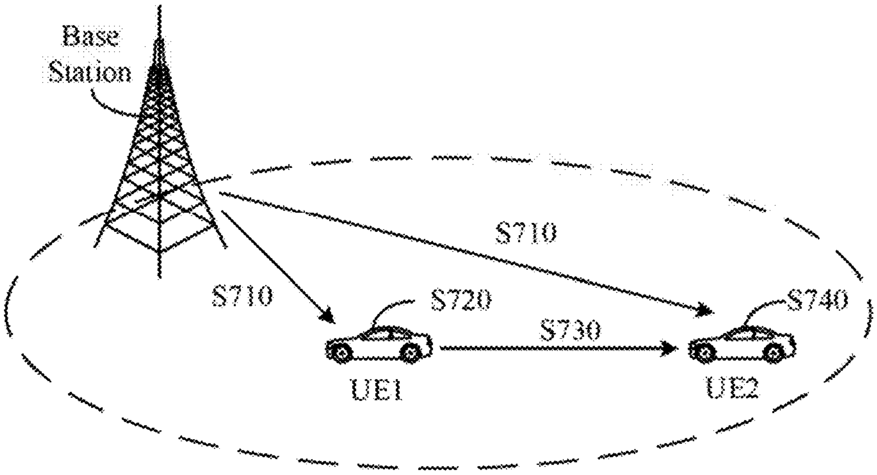
FIG. 7 is a flowchart of a method for time synchronization according to another embodiment of the present disclosure.

In order to facilitate understanding of the present disclosure, the flow of the method for time synchronization according to the embodiments of the present disclosure is described below in connection with the scenario illustrated in FIG. 7, taking a case that the UE1 and the UE2 respectively accesses to the same base station as an example. It should be understood that, reference may be made the above introduction for the terminologies and the specific manners of information transmission in FIG. 7 which will not be repeated below for the sake of brevity. Referring to FIG. 7, it is assumed that the UE1 and the UE2 access to the same base station.

In an operation S710, the base station sends first time information to each of the UE1 and the UE2.

In an operation S720, the UE1 performs absolute time synchronization with the base station based on the first time information.

In an operation S730, the UE1 sends the first synchronization information to the UE2. The first synchronization information does not include the first time information.

In an operation S740, the UE2 performs time synchronization with the UE1 based on the first synchronization information, and the UE2 performs absolute time synchronization with the base station based on the first time information.

After the operation S720, the UE1 performs absolute time synchronization with the base station, and after the operation S740, the UE2 performs absolute time synchronization with the base station, which can be understood as the UE1 and the UE2 perform the absolute time synchronization.

Figure 8:
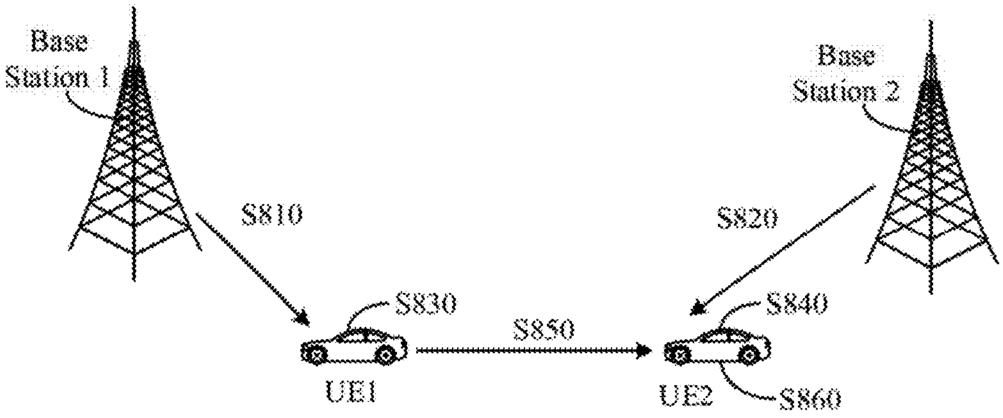
FIG. 8 is a flowchart of a method for time synchronization according to another embodiment of the present disclosure.

In order to facilitate understanding of the present disclosure, the flow of the method for time synchronization according to the embodiments of the present disclosure is described below in connection with the scenario illustrated in FIG. 8 taking a case that the UE1 and the UE2 respectively access to different base stations as an example. It should be understood that reference may be made the above introduction for the terminologies and the specific manners of information transmission in FIG. 8 which will not be repeated below for the sake of brevity. Referring to FIG. 8, assuming that the base station accessed by the UE1 is a base station 1 and the base station accessed by the UE2 is a base station 2, a time difference between the base station 1 and the base station 2 is Δt.

In an operation S810, the base station 1 sends the first time information 1 to the UE 1.

In an operation S820, the base station 2 sends the first time information 2 to the UE 2.

In an operation S830, the UE1 performs absolute time synchronization based on the first time information 1.

In an operation S840, the UE2 performs absolute time synchronization based on the first time information 2.

In an operation S850, the UE1 sends first synchronization information to the UE2.

The first synchronization information carries the time difference Δt between the first base station and the second base station. Reference may be made to the above introduction for the specific manners of acquiring the time difference, which will not be repeated below for the sake of brevity.

In an operation S860, the UE2 performs absolute time synchronization with the UE1 based on the time difference. The second UE may perform absolute time synchronization with multiple candidate synchronization sources. How the second UE selects a target node from the multiple candidate synchronization sources to perform absolute time synchronization will be described below.

As described above, a node of the TSN may have higher precision of time synchronization. Therefore, in case that there are multiple candidate synchronization sources, a synchronization source as an end station of the TSN among the multiple candidate synchronization sources may be preferentially selected as a target node. The synchronization source as the end station of the TSN can be any one of a base station, a UPF and a UE.

In some implementations, the second UE may determine whether to select the first UE as the target node from the multiple candidate synchronization sources for higher precision of time synchronization based on end station information of the first UE, or whether the first UE is a transmission node of a gPTP message. For example, in response to the first UE being an end station of the TSN, the second UE may select the first UE as the target node from the multiple candidate synchronization sources. For another example, in response to the first UE being an incoming node of the TSN, the second UE may select the first UE as the target node from the multiple candidate synchronization sources. For another example, in response to the first UE being a node which sends a gPTP message, the second UE may select the first UE as the target node from the multiple candidate synchronization sources.

Also, in the embodiments of the present disclosure, the second UE may also determine whether to select the first UE as the synchronization source from the multiple candidate synchronization sources based on the end station information of the TSN of the second UE and whether the second UE is a transmission node of a gPTP message. For example, in response to the second UE being an end station of the TSN, the second UE may select the first UE as the target node from the multiple candidate synchronization sources. For another example, in response to the second UE being an incoming node of the TSN, the second UE may select the first UE as the target node from the multiple candidate synchronization sources. For another example, in response to the second UE being a node which sends a gPTP message, the second UE may select the first UE from the multiple candidate synchronization sources as the target node. For another example, in response to the second UE being to perform absolute time synchronization with a UE in the TSN, the second UE may select the first UE as the target node from the multiple candidate synchronization sources.

Based on the above introduction, in some cases, the second UE may request the first UE to carry the first time information in the first synchronization information, then in case that the second UE instructs the first UE to carry the first time information in the first synchronization information, or in case that the first UE carries the first time information in the first synchronization information, the second UE may also select the first UE as the target node from the multiple candidate synchronization sources.

In response to the first UE being unable to be the target node, the second UE selects another candidate synchronization source from the multiple candidate synchronization sources as the target node, and the another candidate synchronization source is a candidate synchronization source, except the first UE, among the multiple candidate synchronization sources.

Figure 9:
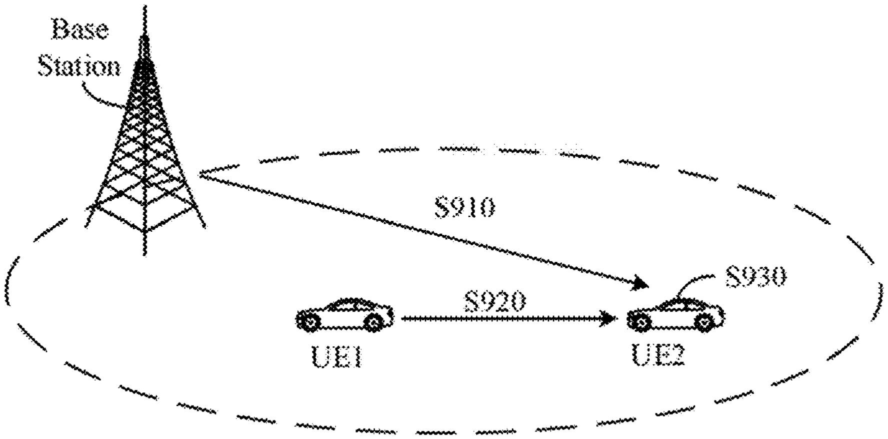
FIG. 9 is a flowchart of a method for time synchronization according to another embodiment of the present disclosure.

In order to facilitate understanding of the present disclosure, a flow of a method for time synchronization according to the embodiments of the present disclosure is described below in connection with the scenario illustrated in FIG. 9, by taking a case that multiple candidate synchronization sources of the UE2 includes a base station accessed by the UE2 and the UE1 to which the UE2 performs sidelink communication as an example. It should be understood that reference may be made the above introduction for the terminologies and the specific manners of information transmission in FIG. 9 which will not be repeated below for the sake of brevity.

In an operation S910, the base station sends reference time information to the UE2.

In an operation S920, the UE1 sends first synchronization information to the UE2. The first synchronization information includes the first time information.

In an operation S930, in response to the UE1 being an end station of the TSN, the UE2 performs time synchronization with the UE1 based on the first time information.

Based on the above introduction, the node (which includes the end station, the incoming node and the outgoing node) of the TSN or the transmission node (which includes the sending end and the receiving end) of the gPTP message has higher precision of time synchronization. Therefore, the above information may be referred to when selecting multiple candidate synchronization sources.

In some implementations, the second UE may determine whether to take the first UE as a candidate synchronization source among multiple candidate synchronization sources for higher precision of time synchronization based on end station information of the first UE, or whether the first UE is a transmission node of a gPTP message. For example, in response to the first UE being an end station of the TSN, the second UE may take the first UE as the candidate synchronization source among the multiple candidate synchronization sources. For another example, in response to the first UE being an incoming node of the TSN, the second UE may take the first UE as the candidate synchronization source among the multiple candidate synchronization sources. For another example, in response to the first UE being a node which sends a gPTP message, the second UE may take the first UE as the candidate synchronization source among the multiple candidate synchronization sources.

In the embodiments of the present disclosure, the second UE may also determine whether the first UE is taken as a candidate synchronization source among multiple candidate synchronization sources based on end station information of the TSN of the second UE and whether the second UE is a transmission node of the gPTP message. For example, in response to the second UE being an end station of the TSN, the second UE may take the first UE as the candidate synchronization source among the multiple candidate synchronization sources. For another example, in response to the second UE being an incoming node of the TSN, the second UE may take the first UE as the candidate synchronization source among the multiple candidate synchronization sources. For another example, in response to the second UE being a node which sends a gPTP message, the second UE takes the first UE as the candidate synchronization source among the multiple candidate synchronization sources. For another example, in response to the second UE being to perform absolute time synchronization with a UE in the TSN, the second UE may take the first UE as the candidate synchronization source among the multiple candidate synchronization sources.

It should be noted that in response to the first UE being unable to be the candidate synchronization source, the second UE selects another synchronization source as the candidate synchronization source, and the another synchronization source is a device, except the first UE, capable of providing the first time information for the second UE.

Based on the above introduction, in some cases, the second UE may request the first UE to carry the first time information in the first synchronization information, then in case that the second UE instructs the first UE to carry the first time information in the first synchronization information, or the first UE carries the first time information in the first synchronization information, the second UE may also take the first UE as the candidate synchronization source among the multiple candidate synchronization sources.

How to select the target node and the candidate synchronization source in the embodiments of the present disclosure is described above, and how to select a synchronization source for time synchronization from multiple candidate synchronization sources in the embodiments of the present disclosure is described below. It should be noted that the synchronization source for time synchronization described below can be understood as a synchronization source for frame boundary synchronization.

Based on the above introduction, the node (which includes the end station, the incoming node and the outgoing node) of the TSN or the transmission node (which includes the sending end and the receiving end) of the gPTP message has higher precision of time synchronization. Therefore, the above information may be referred to when selecting synchronization sources.

In some implementations, in the process of selecting the synchronization source, the second UE may select or preferentially select the node of the TSN as the synchronization source, or the second UE may select or preferentially select the transmission node of the gPTP message as the synchronization source.

In the embodiments of the present disclosure, the second UE may also select the synchronization source based on information about whether the second UE is the node of the TSN or whether the second UE is the transmission node of the gPTP message. For example, in response to the second UE being an end station of the TSN, the second UE may take the node of the TSN as the synchronization source. For another example, in response to the second UE being an incoming node of the TSN, the second UE may take the node of the TSN as the synchronization source. For another example, in response to the second UE being a node which sends the gPTP message, the second UE takes the node which receives the gPTP message as the synchronization source.

In some implementations, the second UE may determine whether to take the first UE as the synchronization source for higher precision of time synchronization based on the end station information of the first UE, or whether the first UE is a transmission node of the gPTP message. For example, in response to the first UE being an end station of the TSN, the second UE may take the first UE as the synchronization source. For another example, in response to the first UE being an incoming node of the TSN, the second UE may take the first UE as the synchronization source. For another example, in response to the first UE being a node which sends a gPTP message, the second UE may take the first UE as the synchronization source.

In the embodiments of the present disclosure, the second UE may also determine whether to take the first UE as the synchronization source based on the end station information of the TSN of the second UE and whether the second UE is the transmission node of the gPTP message. For example, in response to the second UE being an end station of the TSN, the second UE may take the first UE as the synchronization source. For another example, in response to the second UE being an incoming node of the TSN, the second UE may take the first UE as the synchronization source. For another example, in response to the second UE being a node which sends a gPTP message, the second UE may take the first UE as the synchronization source. For another example, in response to the second UE being to perform absolute time synchronization with a UE in the TSN, the second UE may take the first UE as the synchronization source.

Based on the above introduction, in some cases, the second UE may request the first UE to carry the first time information in the first synchronization information, In case that the second UE instructs the first UE to carry the first time information in the first synchronization information, or the first UE carries the first time information in the first synchronization information, the second UE may also take the first UE as the synchronization source.

It should be noted that in a case that selection of the synchronization source fails or the synchronization source cannot be selected with the method of the embodiments of the present disclosure, the synchronization source can be selected for the second UE based on the existing synchronization source selection mechanism, which is not limited in the embodiments of the present disclosure.

In the embodiments of the present disclosure, the operations of selecting the synchronization source above can be performed in combination with the operation of performing absolute time synchronization by the UE described above. For example, the operations may be performed in the process of performing absolute time synchronization with the target node, time synchronization based on the frame boundary with the synchronization source above. In the embodiments of the present disclosure, the above operations for selecting the synchronization source may be performed separately.

In the embodiments of the present disclosure, the operations of selecting the synchronization source based on information of the node of the TSN or information of the transmission node of the gPTP message is beneficial to improving the precision of time synchronization based on the synchronization source.

In some cases, there may be a time delay in transmitting the first time information between the first UE and the second UE. Therefore, the operation S530 further includes the following operation. The second UE performs absolute time synchronization with the target node by performing Propagation Delay Compensation (PDC) based on the first time information.

For example, when the first UE receives the first time information, the first time information indicates that the time corresponding to an SFN #1 is five minutes and five seconds past five (5:05:05), but the first UE sends the first time information to the second UE after delaying for a time delay of 1 second. Therefore, the first time information received by the second UE indicates that the time corresponding to the SFN #1 is changed to five minutes and six seconds past five (5:05:06). At this time, the second UE performs the PDC to change the time corresponding to the SFN #1 in the first time information to be five minutes and five seconds past five (5:05:05), and performs the absolute time synchronization based on the first time information acquired after performing the PDC.

The method embodiments of the present disclosure are described in detail above with reference to FIGS. 1 to 9 and the device embodiments of the present disclosure are described in detail below with reference to FIGS. 10 to 12. It should be understood that the description of the method embodiments and the description of the device embodiments correspond to each other. Therefore, reference may be made to the preceding method embodiments for portions not described in detail in the device embodiments.

Figure 10:
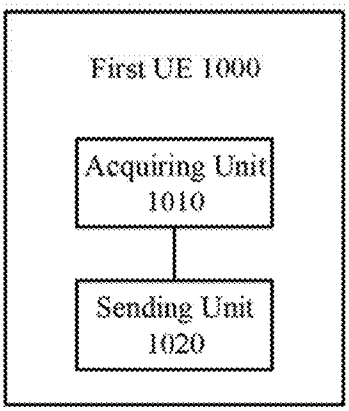
FIG. 10 is a schematic diagram of a first UE according to an embodiment of the present disclosure.

FIG. 10 is a schematic diagram of the first UE according to an embodiment of the present disclosure. The first UE 1000 illustrated in FIG. 10 includes an acquiring unit 1010 and a sending unit 1020.

The acquiring unit 1010 is configured to acquire first time information. The first time information is absolute time information, reference time information or partial information in the reference time information.

The sending unit 1020 is configured to send first synchronization information to a second UE through a sidelink. The first synchronization information includes the first time information acquired by the acquiring unit, or the first synchronization information does not include the first time information acquired by the acquiring unit.

Optionally, the first time information is transmitted to the second UE through a Synchronization Signal Block (SSB), a Physical Sidelink Broadcast Channel (PSBCH) or dedicated signaling.

Optionally, the first time information is used to perform absolute time synchronization with the second UE, or the first time information is used to determine absolute time corresponding to a reference frame or a reference time slot in the first synchronization information.

Optionally, whether the first synchronization information includes the first time information is indicated by a base station accessed by the first UE, or determined by the first UE, or indicated by the second UE, or determined by using a predetermined rule.

Optionally, in response to whether the first synchronization information includes the first time information being determined by the first UE, the first UE further includes a processing unit. The processing unit is configured to determine that the first synchronization information includes the first time information based on at least one of following information: the first UE is a UE as an end station of a Time Sensitive Network (TSN); the first UE is an incoming node of the TSN; the second UE is a UE as an end station of the TSN; the second UE is an outgoing node of the TSN; the first UE knows that the second UE is a UE as an end station of the TSN; the first UE receives a request from the second UE, and the request requests the first UE to send the first time information; the first UE is a node which sends a generalized Precision Time Protocol (gPTP) message; or the second UE is a node which receives a gPTP message.

Optionally, the first UE further includes a receiving unit. The receiving unit is configured to receive second synchronization information sent by a third UE. The second synchronization information includes indication information, and the indication information instructs the first UE to send the first synchronization information including the first time information to the second UE.

Optionally, the third UE is a UE as an end station of the TSN.

Optionally, the acquiring unit is further configured to acquire the first time information from the third UE.

Optionally, the acquiring unit is further configured to acquire the first time information from a base station accessed by the first UE.

Optionally, the first time information includes reference time.

Optionally, the first time information further includes at least one of: a reference System Frame Number (SFN), a reference time slot, uncertainty or a type of synchronization time.

Optionally, the first synchronization information is carried in a Physical Sidelink Broadcast Channel (PSBCH), and the first synchronization information includes a time slot number and a System Frame Number (SFN) corresponding to a Primary Synchronization Signal (PSS) or a Secondary Synchronization Signal (SSS).

Figure 11:
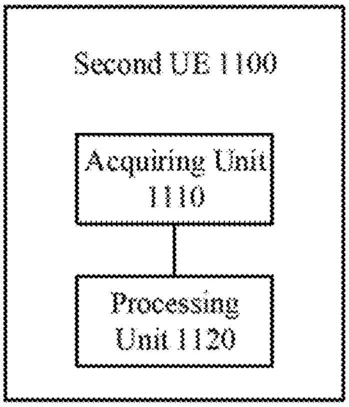
FIG. 11 is a schematic diagram of a second UE according to an embodiment of the present disclosure.

FIG. 11 is a schematic diagram of the second UE according to an embodiment of the present disclosure. The second UE 1100 illustrated in FIG. 11 includes an acquiring unit 1110 and a processing unit 1120.

The acquiring unit 1110 is configured to acquire first time information. The first time information is absolute time information, reference time information or partial information in the reference time information.

The processing unit 1120 is configured to perform absolute time synchronization with a target node according to the first time information acquired by the acquiring unit.

The target node is a first UE connected to the second UE through a sidelink, or the target node is a synchronization source as an end station of a Time Sensitive Network (TSN) among multiple candidate synchronization sources, or the target node is a base station accessed by the second UE.

Optionally, the first time information is acquired from first synchronization information sent by the first UE, or the first time information is acquired from a Synchronization Signal Block (SSB) sent by the first UE, a Physical Sidelink Broadcast Channel (PSBCH) sent by the first UE or dedicated signaling sent by the first UE, or the first time information is acquired from the base station accessed by the second UE.

Optionally, the first synchronization information is carried in the Physical Sidelink Broadcast Channel (PSBCH), and the first synchronization information includes a time slot number and a System Frame Number (SFN) corresponding to a Primary Synchronization Signal (PSS) or a Secondary Synchronization Signal (SSS).

Optionally, the first time information includes reference time.

Optionally, the first time information further includes at least one of: a reference System Frame Number (SFN), a reference time slot, uncertainty or a type of synchronization time.

Optionally, the processing unit is further configured to perform the absolute time synchronization with the target node by performing Propagation Delay Compensation (PDC) according to the first time information.

Optionally, the target node is the first UE, and the processing unit is further configured to: in response to a base station accessed by the first UE being the same as the base station accessed by the second UE, perform, by the second UE, absolute time synchronization with the first UE according to the first time information; or in response to the base station accessed by the first UE being different from the base station accessed by the second UE, perform, by the second UE, absolute time synchronization with the first UE according to the first time information and time difference between the base station accessed by the first UE and the base station accessed by the second UE; or in response to the base station accessed by the first UE and the base station accessed by the second UE have the same frame boundary or the same absolute time, perform, by the second UE, absolute time synchronization with the first UE according to the first time information; or in response to the base station accessed by the first UE and the base station accessed by the second UE have different frame boundaries or different absolute time, perform, by the second UE, absolute time synchronization with the first UE according to the first time information and time difference between the base station accessed by the first UE and the base station accessed by the second UE.

Optionally, the multiple candidate synchronization sources include at least one of: the first UE, a base station, and a Global Navigation Satellite System (GNSS) clock source.

Optionally, the processing unit is further configured to select, by the second UE, the first UE from the multiple candidate synchronization sources as the target node in response to at least one of following conditions being met: the second UE is an end station of the TSN; the first UE is an end station of the TSN; the first UE is an incoming node of the TSN; the second UE is an outgoing node of the TSN; the first UE is a node which sends a generalized Precision Time Protocol (gPTP) message; the second UE is a node which receives a gPTP message; the second UE is to perform the absolute time synchronization with a UE in the TSN; the second UE instructs the first UE to carry the first time information in the first synchronization information; or the first UE carries the first time information in the first synchronization information.

Optionally, the processing unit is further configured to: in response to the first UE being unable to be the target node, select, by the second UE, another candidate synchronization source from the multiple candidate synchronization sources as the target node. The another candidate synchronization source is a candidate synchronization source, except the first UE, among the multiple candidate synchronization sources.

Optionally, the processing unit is further configured to: select an end station of the TSN from the multiple candidate synchronization sources as a target synchronization source; and perform time synchronization based on the target synchronization source.

Optionally, the processing unit is further configured to: select, by the second UE, the end station of the TSN as the target synchronization source in response to at least one of following conditions being met: the second UE is an end station of the TSN; the first UE is an end station of the TSN; the first UE is an incoming node of the TSN; the second UE is an outgoing node of the TSN; the first UE is a node which sends a generalized Precision Time Protocol (gPTP) message; the second UE is a node which receives a gPTP message; the second UE is to perform the absolute time synchronization with a UE in the TSN; the second UE instructs the first UE to carry the first time information in the first synchronization information; or the first UE carries the first time information in the first synchronization information.

Optionally, the processing unit is further configured to: in response to the first UE being unable to be the target synchronization source, select, by the second UE, another synchronization source from the multiple candidate synchronization sources as the target synchronization source, and the another synchronization source is a device, except the first UE, which can provide the first time information for the second UE.

Optionally, the target node is the first UE, and the processing unit is further configured to instruct the first UE to carry the first time information in the first synchronization information based on at least one of following information: the first UE being a UE as an end station of the Time Sensitive Network (TSN); the first UE is an incoming node of the TSN; the second UE is a UE as an end station of the TSN; the second UE is an outgoing node of the TSN; the first UE knows that the second UE is a UE as an end station of the TSN; whether the first UE is a node which sends a generalized Precision Time Protocol (gPTP) message; whether the second UE is a node which receives a gPTP message.

Figure 12:
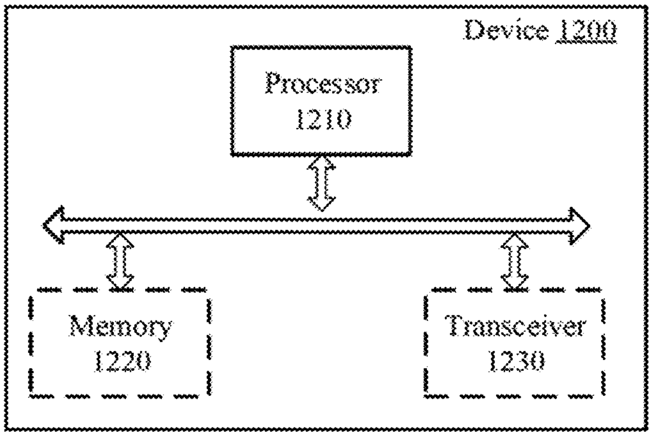
FIG. 12 is a schematic structural diagram of a device for time synchronization according to an embodiment of the present disclosure.

FIG. 12 is a schematic structural diagram of a device for time synchronization according to an embodiment of the present disclosure. The dotted line in FIG. 12 indicates that the unit or module is optional. The device 1200 may be used to implement the methods described in the method embodiments. The device 1200 may be a chip, a terminal device, or a network device.

The device 1200 may include one or more processors 1210. The processor 1210 may support the device 1200 to implement the methods described previously in the method embodiments. The processor 1210 may be a general purpose processor or a special purpose processor. For example, the processor could be a central processing unit (CPU). Optionally, the processor may also be other general purpose processors, a digital signal processors (DSP), an application specific integrated circuits (ASIC), a field programmable gate arrays (FPGA) or other programmable logic devices, a discrete gate or a transistor logic devices, a discrete hardware components, and the like. The general purpose processor may be a microprocessor or the processor may be any conventional processor or the like.

The device 1200 may further include one or more memories 1220. The memory 1220 stores a program that can be executed by the processor 1210 to cause the processor 1210 to perform the methods described previously in the method embodiments. The memory 1220 may be independent of the processor 1210 or may be integrated within the processor 1210.

The device 1200 may further include a transceiver 1230. The processor 1210 may communicate with other devices or chips through the transceiver 1230. For example, the processor 1210 may transmit and receive data with other devices or chips through the transceiver 1230.

An embodiment of the present disclosure further provides a computer-readable storage medium for storing a program. The computer-readable storage medium may be applied to the terminal device or the network device provided by the embodiments of the present disclosure, and the program causes a computer to perform the method performed by the terminal device or the network device in various embodiments of the present disclosure.

An embodiment of the present disclosure further provides a computer program product. The computer program product includes a program. The computer program product may be applied to the terminal device or the network device provided by the embodiments of the present disclosure, and the program causes a computer to perform a method performed by the terminal device or the network device in various embodiments of the present disclosure.

An embodiment of the present disclosure further provides a computer program. The computer program may be applied to the terminal device or the network device provided by the embodiments of the present disclosure, and the computer program causes a computer to perform the method performed by the terminal device or the network device in various embodiments of the present disclosure.

It should be understood that, in the embodiments of the present disclosure, "B corresponding to A" means that B is associated with A, and B may be determined based on A. It should also be understood that the case that B may be determined based on A does not only mean that B may be determined based on only A, but may also mean that B may be determined based on A and/or other information.

It is further to be understood that, in the embodiments of the present disclosure, term "and/or" represents only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It should be understood that in various embodiments of the present disclosure, the sequence number of the above-mentioned processes does not define the execution order, and the execution order of the processes should be determined by the function and inherent logic thereof, and thus cannot constitute any limitation on the implementation process of the embodiments of the present disclosure.

In several embodiments provided in the present disclosure, it should be understood that the disclosed systems, devices and methods may be implemented in other ways. For example, the above-described device embodiments are only schematic. For example, the division of the unit is only a logical function division, and in practice, there may be another division mode. For example, multiple units or components may be combined or integrated into another system, or some features may be ignored or not performed. On the other hand, the coupling or direct coupling or communication connection illustrated or discussed may be indirect coupling or communication connection through some interfaces, apparatuses or units, and may be electrical, mechanical or other form.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the present disclosure may be integrated into one processing unit, each unit may physically exist alone, or two or more units may be integrated into one unit.

The above-described embodiments may be implemented entirely or partially by software, hardware, firmware or any combination thereof. When implemented by using software, the above-described embodiments can be implemented entirely or partially in the form of a computer program product. The computer program product includes one or more computer instructions. When the one or more computer program instructions are loaded and executed on a computer, the processes or functions described in accordance with the embodiments of the present disclosure are generated entirely or partially. The computer may be a general purpose computer, a special purpose computer, a computer network, or other programmable apparatus. The computer instructions may be stored in a computer-readable storage medium or transmitted from one computer-readable storage medium to another computer-readable storage medium. For example, the computer instructions may be transmitted from a Web site, a computer, a server, or a data center to another Web site, another computer, another server, or another data center through a wired manner (e.g., coaxial cable, optical fiber, digital subscriber line (DSL)) or a wireless manner (e.g., infrared, wireless, microwave, etc.). The computer-readable storage medium may be any usable medium that a computer can read or a data storage device such as a server, a data center, or the like that includes one or more usable media integration. The usable media may be magnetic media (e.g., floppy disk, hard disk, magnetic tape), optical media (e.g., digital video disc (DVD)), or semiconductor media (e.g., solid state disk (SSD)), etc.

The foregoing descriptions are merely specific embodiments of the present disclosure, but the protection scope of the present disclosure is not limited thereto. Any change or replacement readily figured out by a person skilled in the art within the technical scope disclosed in the present disclosure shall fall within the protection scope of the present disclosure. Therefore, the protection scope of the present disclosure shall conform to the protection scope of the claims.

The invention claimed is:

1. A method for time synchronization, comprising:

acquiring, by a first User Equipment (UE), first time information, wherein the first time information is absolute time information, reference time information or partial information in the reference time information; and sending, by the first UE, first synchronization information to a second UE through a sidelink, wherein the first synchronization information comprises the first time information, or the first synchronization information does not comprise the first time information, wherein the first time information is transmitted to the second UE through a Synchronization Signal Block (SSB), a Physical Sidelink Broadcast Channel (PSBCH) or dedicated signaling, wherein the first time information is used to perform absolute time synchronization with the second UE, or the first time information is used to determine absolute time corresponding to a reference frame or a reference time slot in the first synchronization information, wherein whether the first synchronization information comprises the first time information is indicated by a base station accessed by the first UE, or determined by the first UE, or indicated by the second UE, or determined by using a predetermined rule, wherein the method further comprises; in response to whether the first synchronization information comprises the first time information being determined by the first UE, determining, by the first UE, that the first synchronization information comprises the first time information based on at least one of following information:

the first UE is a UE as an end station of a Time Sensitive Network (TSN);

the first UE is an incoming node of the TSN;

the second UE is a UE as the end station of the TSN;

the second UE is an outgoing node of the TSN;

the first UE knows that the second UE is a UE as the end station of the TSN;

the first UE receives a request from the second UE, wherein the request is for requesting the first UE to send the first time information;

the first UE is a node which sends a generalized Precision Time Protocol (gPTP) message; or the second UE is a node which receives the gPTP message.

2. The method of claim 1, further comprising:

receiving, by the first UE, second synchronization information sent by a third UE, wherein the second synchronization information comprises indication information, and the indication information instructs the first UE to send the first synchronization information comprising the first time information to the second UE, wherein the third UE is a UE as an end station of a TSN, wherein acquiring, by the first UE, the first time information comprises:

acquiring, by the first UE, the first time information from the third UE.

3. The method of claim 1, wherein acquiring, by the first UE, the first time information comprises:

acquiring, by the first UE, the first time information from a base station accessed by the first UE, wherein the first time information comprises reference time, wherein the first time information further comprises at least one of a reference System Frame Number (SFN), a reference time slot, uncertainty or a type of synchronization time.

4. The method of claim 1, wherein the first synchronization information is carried in a Physical Sidelink Broadcast Channel (PSBCH), and the first synchronization information comprises a time slot number and a System Frame Number (SFN) corresponding to a Primary Synchronization Signal (PSS) or a Secondary Synchronization Signal (SSS).

5. A first User Equipment (UE), comprising:

a memory for storing a program;

a transceiver; and a processor, wherein the processor is configured to invoke the program in the memory to:

acquire first time information, wherein the first time information is absolute time information, reference time information or partial information in the reference time information; and control the transceiver to send first synchronization information to a second UE through a sidelink, wherein the first synchronization information comprises the first time information, or the first synchronization information does not comprise the first time information, wherein the first time information is transmitted to the second UE through a Synchronization Signal Block (SSB), a Physical Sidelink Broadcast Channel (PSBCH) or dedicated signaling, wherein the first time information is used to perform absolute time synchronization with the second UE, or the first time information is used to determine absolute time corresponding to a reference frame or a reference time slot in the first synchronization information, wherein whether the first synchronization information comprises the first time information is indicated by a base station accessed by the first UE, or determined by the first UE, or indicated by the second UE, or determined by using a predetermined rule, wherein in response to whether the first synchronization information comprises the first time information being determined by the first UE, the processor is configured to invoke the program in the memory to determine that the first synchronization information comprises the first time information based on at least one of following information:

the first UE is a UE as an end station of a Time Sensitive Network (TSN);

the first UE is an incoming node of the TSN;

the second UE is a UE as the end station of the TSN;

the second UE is an outgoing node of the TSN;

the first UE knows that the second UE is a UE as the end station of the TSN;

the first UE receives a request from the second UE, wherein the request is for requesting the first UE to send the first time information;

the first UE is a node which sends a generalized Precision Time Protocol (gPTP) message; or the second UE is a node which receives a gPTP message.

6. The first UE of claim 5, wherein the processor is configured to invoke the program stored in the memory to:

control the transceiver to receive second synchronization information sent by a third UE, wherein the second synchronization information comprises indication information, and the indication information instructs the first UE to send the first synchronization information comprising the first time information to the second UE, wherein the third UE is a UE as an end station of a TSN, wherein the processor is configured to invoke the program in the memory to:

acquire the first time information from the third UE.

7. The first UE of claim 5, wherein the processor is configured to invoke the program, in the memory to:

acquire the first time information from a base station accessed by the first UE, wherein the first time information comprises reference time, wherein the first time information further comprises at least one of a reference System Frame Number (SEN), a reference time slot, uncertainty or a type of synchronization time.

8. The first UE of claim 5, wherein the first synchronization information is carried in a Physical Sidelink Broadcast Channel (PSBCH), and the first synchronization information comprises a time slot number and a System Frame Number (SEN) corresponding to a Primary Synchronization Signal (PSS) or a Secondary Synchronization Signal (SSS).

9. A second User Equipment (UE), comprising:

a memory for storing a program; and a processor, wherein the processor is configured to invoke the program in the memory to:

acquire first time information, wherein the first time information is absolute time information, reference time information or partial information in the reference time information; and perform absolute time synchronization with a target node according to the first time information, wherein the target node is a first UE connected to the second UE through a sidelink, or the target node is a synchronization source as an end station of a Time Sensitive Network (TSN) among a plurality of candidate synchronization sources, or the target node is a base station accessed by the second UE, wherein the first time information is acquired from first synchronization information sent by the first UE, or the first time information is acquired from a Synchronization Signal Block (SSB) sent by the first UE, a Physical Sidelink Broadcast Channel (PSBCH) sent by the first UE or dedicated signaling sent by the first UE, or the first time information is acquired from the base station accessed by the second UE, wherein the processor is configured to invoke the program in the memory to:

select the end station of the TSN from the plurality of candidate synchronization sources as a target synchronization source; and perform time synchronization based on the target synchronization source, wherein the processor is configured to invoke the program in the memory to: select the end station of the TSN as the target synchronization source in response to at least one of following conditions being met:

the second UE is the end station of the TSN;

the first UE is the end station of the TSN;

the first UE is an incoming node of the TSN;

the second UE is an outgoing node of the TSN;

the first UE is a node which sends a generalized Precision Time Protocol (gPTP) message;

the second UE is a node which receives the gPTP message;

the second UE is to perform absolute time synchronization with a UE in the TSN;

the second UE instructs the first UE to carry the first time information in first synchronization information; or the first UE carries the first time information in the first synchronization information.

10. The second UE of claim 9, wherein the first synchronization information is carried in the Physical Sidelink Broadcast Channel (PSBCH), and the first synchronization information comprises a time slot number and a System Frame Number (SFN) corresponding to a Primary Synchronization Signal (PSS) or a Secondary Synchronization Signal (SSS), wherein the first time information comprises reference time, wherein the first time information further comprises at least one of a reference System Frame Number (SFN), a reference time slot, uncertainty or a type of synchronization time.

11. The second UE of claim 9, wherein the processor is configured to invoke the program in the memory to: perform absolute time synchronization with the target node by performing Propagation Delay Compensation (PDC) according to the first time information, wherein the target node is the first UE, and the processor is configured to invoke the program in the memory to:

in response to a base station accessed by the first UE being the same as the base station, accessed by the second UE, perform absolute time synchronization with the first UE according to the first time information; or in response to the base station accessed by the first UE being different from the base station accessed by the second UE, perform absolute time synchronization with the first UE according to the first time information and a time difference between the base station accessed by the first UE and the base station accessed by the second UE; or in response to the base station accessed by the first UE and the base station accessed by the second UE having a same frame boundary or same absolute time, perform absolute time synchronization with the first UE according to the first time information; or in response to the base station accessed by the first UE and the base station accessed by the second UB having different frame boundaries or different absolute time, perform absolute time synchronization with the first UE according to the first time information and a time difference between the base station accessed by the first UE and the base station accessed by the second UE.

12. The second UE of claim 9, wherein the plurality of candidate synchronization sources comprise at least one of the first UE, a base station, and a Global Navigation Satellite System (GNSS) clock source, wherein the processor is configured to invoke the program in the memory to: select the first UE from the plurality of candidate synchronization sources as the target node in response to at least one of following conditions being met;

the second UE is the end station of the TSN;

the first UE is the end station of the TSN;

the first UE is an incoming node of the TSN;

the second UE is an outgoing node of the TSN;

the first UB is a node which sends a generalized Precision Time Protocol (gPTP) message;

the second UE is a node which receives the gPTP message;

the second UE is to perform absolute time synchronization with a UE in the TSN;

the second UE instructs the first UE to carry the first time information in first synchronization information; or the first UE carries the first time information in the first synchronization information, wherein the processor is configured to invoke the program in the memory to; in response to the first UE being unable to be the target node, select another candidate synchronization source from the plurality of candidate synchronization sources as the target node, wherein the another candidate synchronization source is a candidate synchronization source, except the first UE, among the plurality of candidate synchronization sources.

13. The second UE of claim 9, wherein the processor is configured to invoke the program in the memory to: in response to the first UE being unable to be the target synchronization source, select another synchronization source from the plurality of candidate synchronization sources as the target synchronization source, wherein the another synchronization source is a device, except the first UE, capable of providing the first time information for the second UE.

14. The second UE of claim 9, wherein the target node is the first UE, and the processor is configured to invoke the program in the memory to: instruct the first UE to carry the first time information in the first synchronization information based on at least one of following information:

the first UE is a UE as the end station of the TSN;

the first UE is an incoming node of the TSN;

the second UE is a UE as the end station of the TSN;

the second UE is an outgoing node of the TSN;

the first UE knows that the second UE is a UE the an end station of the TSN;

whether the first UE is a node which sends a generalized Precision Time Protocol (gPTP) message; or whether the second UE is a node which receives the gPTP message.

* * * * *